UNITED STATES PATENT OFFICE.

JACOB SIMON DE HAAN, OF KLATEN, JAVA.

MANUFACTURE OF CANE-SUGAR.

1,101,071.

Specification of Letters Patent. Patented June 23, 1914.

No Drawing. Application filed April 7, 1913. Serial No. 759,459.

*To all whom it may concern:*

Be it known that I, JACOB SIMON DE HAAN, a subject of the Queen of the Netherlands, residing at Klaten, Java, Dutch East Indies, have invented certain new and useful Improvements in the Manufacture of Cane-Sugar; and I do hereby declare the following to be a full, clear, and exact description of the invention, such as will enable others skilled in the art to which it appertains to make and use the same.

In the carbonation method as used at present for the purification of juices containing cane sugar about 100 liters of lime milk at 20° Bé. to 1000 liters of juice is used. The greater part of this lime milk is of no use for the real purification of the juice, but is only used for obtaining a precipitate, formed by the great quantity of carbonate of calcium, to facilitate filtering in the filter presses, and for forming hard cakes that can be readily lixiviated.

Efforts have been made to reduce the waste of lime-milk, and to replace the excess of carbonate of calcium customarily formed, by other materials, such as infusorial earth, old filter refuse, &c., but without obtaining the desired results. The leading idea was to facilitate filtration of the precipitate by increasing the quantity of the materials that aid the filtration.

My invention has for its object to obtain good filtration, though only a small quantity of lime milk is used, by controlling the carbonation in such a way that the carbonate of calcium resulting from the action of the carbonic acid on the lime milk is formed in large crystals of regular size, which enhances the facility of filtration to a great extent, whereby more than 50% of the limestone may be saved.

My improved process is carried out as follows: The cane juice, obtained from the sugar cane by means of mills, or by diffusion, is brought to a temperature of about 45-50 Celsius, by circulating said juice through heaters, or by placing it in pans provided with steam heating apparatus. As soon as the juice in the carbonators has attained the desired temperature, a thin stream of lime milk is supplied and the current of carbonic acid is supplied at the same time. To render the new process as profitable as possible, the stream of lime milk and the current of carbonic acid are regulated in such a way that the degree of alkalinity of the juice during the whole length of time that lime milk is added does not exceed 0.3 grams CaO, and is not less than 0.25 grams CaO per liter of juice, which may be controlled by test paper of the same degree of acidity, the so-called "Dupont paper" being an excellent testing medium. As soon as the quantity of lime milk necessary for the purification of the juice has been used, the carbonation is continued in the known way until the juice has become neutral to phenolphthalein. After this point is reached the carbonation process is still continued for some time to prevent the alkaline reaction of the juice from returning, which may occur from the solution of the remaining particles of $Ca(OH)_2$, an action which is not desirable for the later treatment of the juice. The duration of this over-carbonation differs, but is generally not more than one minute, and is only continued sufficiently for the heated juice to yield a fluid juice after filtration which is only slightly alkaline, and never acid to phenolphthalein. The fluid juice obtained is then, either directly, or, which is better, after sulfitation to neutral reaction with litmus, led to the vaporization plant.

Aside from the important economy of lime and the resulting use of less coke and filter cloth, there is a smaller loss of sugar in the filter-dirt, because of the smaller quantity of precipitate produced; a smaller capacity required for the lime-kiln, the pump for carbonic acid, and the filter-presses.

The improved process also has the following advantages:—

*a.* The lime milk is never in contact with the juice in such a concentration, that the reducing sugars are attacked and transformed into combinations of calcium. By this means the resulting fluid juice has but a low lime-standard.

*b.* The color of the fluid juice is considerably brighter than that of the fluid juice obtained by the present process of carbonation.

*c.* The troublesome period of ebullition is avoided.

I claim—

1. Improvement in the method of purification of raw juice in the manufacture of cane sugar by the carbonation process, which comprises heating the juice, then gradually adding lime-milk to the raw juice and simultaneously leading carbonic acid through it, the alkalinity of the juice during this operation being kept nearly constant, preferably between 0.25 and 0.3 grams CaO per liter of juice.

2. The method of purifying raw cane sugar juice which comprises heating the raw juice, then gradually adding both lime-milk and carbonic acid, and controlling the supply of milk of lime and carbonic acid to form large crystals of carbonate of lime while maintaining the alkalinity of the juice low and nearly constant.

In testimony that I claim the foregoing as my invention, I have signed my name in presence of two subscribing witnesses.

JACOB SIMON DE HAAN.

Witnesses:
G. SIRMAY,
E. W. PEERSE.